FLOW CONTROL DEVICES FOR FLOW CONDUCTORS

Original Filed April 30, 1959 2 Sheets-Sheet 1

INVENTOR:
JACK W. TAMPLEN
BY
Donald R. Johnson
ATTY

FLOW CONTROL DEVICES FOR FLOW CONDUCTORS

Original Filed April 30, 1959 2 Sheets-Sheet 2

INVENTOR:
JACK W. TAMPLEN
BY Donald R. Johnson
ATTY.

United States Patent Office

Re. 26,319
Reissued Dec. 5, 1967

26,319
FLOW CONTROL DEVICES FOR FLOW CONDUCTORS

Jack W. Tamplen, Denton County, Tex., assignor to Sun Oil Company, Philadelphia, Pa., a corporation of New Jersey Original No. 3,079,996, dated Mar. 5, 1963, Ser. No. 809,936, Apr. 30, 1959. Application for reissue June 15, 1967, Ser. No. 653,585
15 Claims. (Cl. 166—115)

Matter enclosed in heavy brackets [ ] appears in the original patent but forms no part of this reissue specification; matter printed in italics indicates the additions made by reissue.

This invention relates to well tools and more particularly to a flow control device which is positionable in a well flow conductor, such as a tubing string, for controlling the flow of fluids from two sources through the tubing string.

An object of the invention is to provide a flow control conductor for controlling the flow of fluids from two sources into the well flow conductor.

Another object of the invention is to provide a new and improved well tool for simultaneously producing well fluids from two zones of a well through a single production well flow conductor or tubing string.

Still another object is to provide a well tool for simultaneously producing well fluids from two zones of a well through a single production tubing string having means for preventing flow of the well fluid between the two zones.

A further object of the invention is to provide a well tool for producing well fluids from two zones of a well which utilizes the flow of well fluid of a high pressure zone to produce or lift well fluids from the low pressure zone.

A still further object of the invention is to provide a well tool for simultaneously producing well fluids from two zones of a well through a single tubing string having a flow passage with a restricted orifice for the flow of well fluids from each production zone whereby by proper selection of the effective sizes of the orifices the production from each of the zones may be controlled to secure any desired ratio of rates of flow of the well fluids from the two production zones.

Still another object is to provide a main flow control device positionable in a well flow conductor for controlling the flow of fluids from two sources into the well flow conductor while preventing flow of fluids between the two sources.

A further object is to provide an auxiliary flow device securable to the main flow control device providing restricted orifices individually to control the rates of flow of fluid from each of the two sources.

Additional objects and advantages of the invention will be readily apparent from the reading of the following description of a device constructed in accordance with the invention, and reference to the accompanying drawings thereof, wherein.

Figure 1:
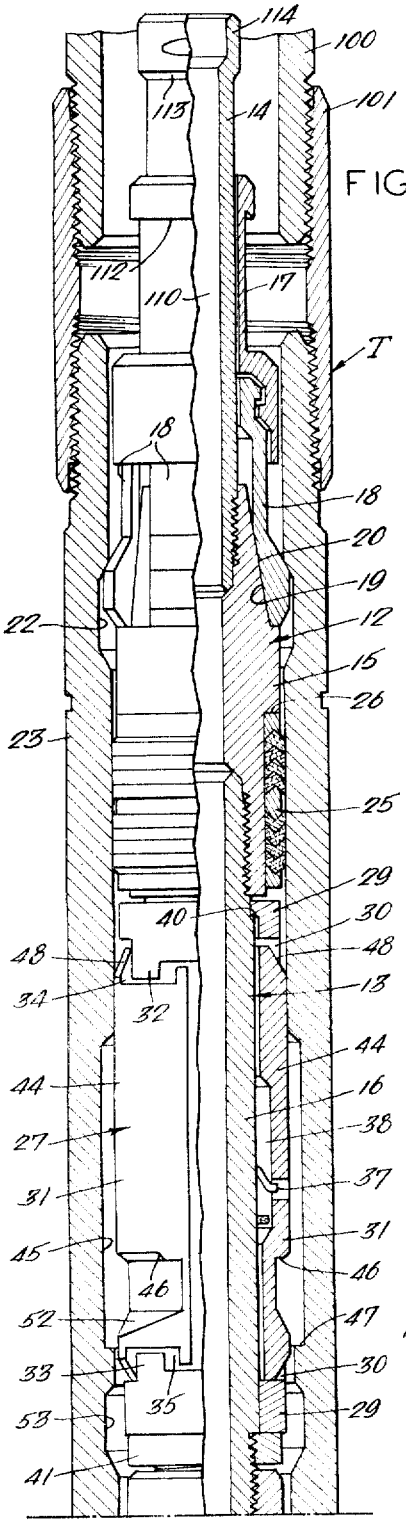
FIGURE 1 is a view, partly in elevation and partly in section, of the upper portions of a well tool embodying the invention located in a production string for simultaneously producing well fluids from two production zones of the well through a tubing string while preventing flow of fluids from the tubing string into either of the production zones.
Figure 2:
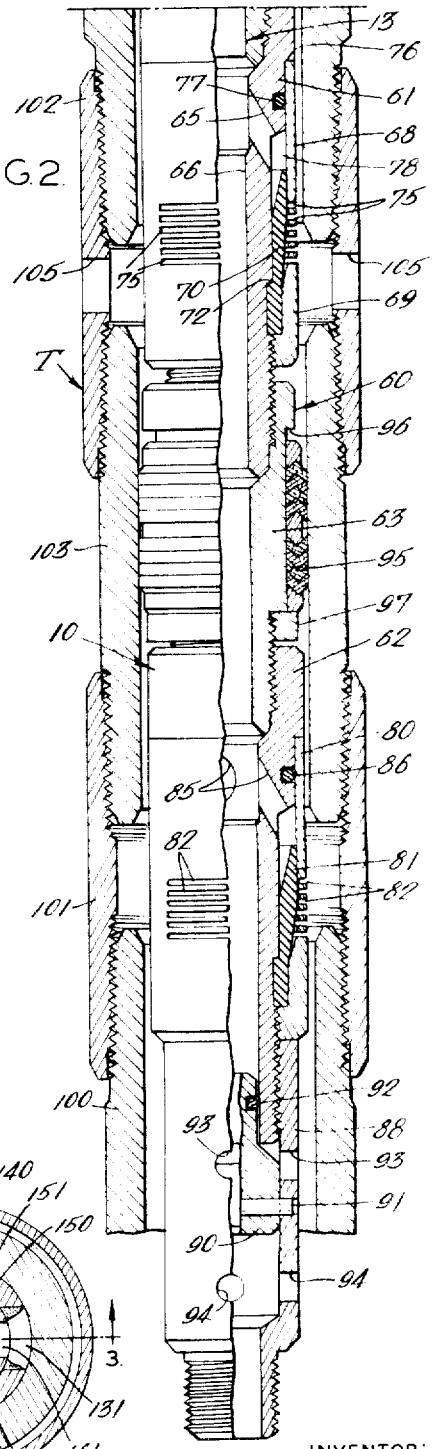
FIGURE 2 is a view similar to FIGURE 1, being a continuation thereof, and showing the lower portions of the well tool.
Figure 4:
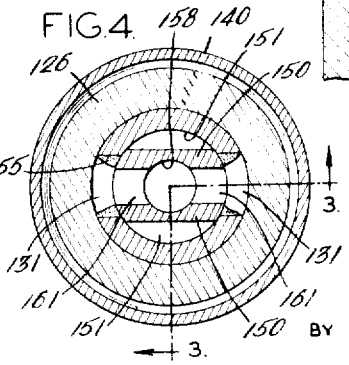
FIGURE 4 is a cross-sectional view taken on line 4—4 of FIGURE 5.

Referring now to the drawing, the main flow control device 10 for permitting flow of well fluids from two different sources or production zones into the tubing string T, while preventing any flow from the tubing string, into either of the producing zones, is shown releasably anchored in the tubing string T by an anchoring or well tool device 12 which may be of the type disclosed in the patent to Miller, No. 2,673,614. The anchoring device includes a mandrel 13 having an upper section 14, an intermediate expander section 15 and a lower section 16 threadedly joined together.

A dog holder 17 is slidably mounted on the upper end of the mandrel section 14 for limited longitudinal movement thereon and supports a plurality of dogs 18 which are movable outwardly to expanded position upon upward movement of the mandrel relative to the dogs due to the camming engagement of the camming surfaces 19 and 20 of the dogs and of the expander mandrel section, respectively, into an internal annular locking recess 22 of the landing nipple 23 connected in the tubing string to form a part thereof. A packing assembly 25 is disposed about the expander mandrel section beneath a downwardly facing annular shoulder 26 thereof which limits upward movement of the packing assembly 25 on the expander mandrel section.

A selector key assembly 27 mounted on the lower mandrel section 16 includes a tubular key holder or retainer 29 having longitudinal slots 30 through which the selector keys 31 are adapted to move between retracted positions adjacent the lower mandrel section and expanded positions remote from the mandrel. The key retainer is provided with projections 32 and 33 which extend into the slots 34 and 35 at the upper and lower ends, respectively, of the selector keys to limit their outward displacement relative to the mandrel. The selector keys are biased outwardly by springs 37 which have portions abutting the mandrel and other portions engaging the keys and biasing them outwardly. The springs 37 are adapted to be disposed in the internal recesses 38 of the keys when the keys are moved to the retracted positions illustrated in FIGURES 1 and 3. The key retainer is provided at its upper end with an internal flange 40 which abuts an upwardly facing annular shoulder of the lower mandrel section to limit downward movement of the sleeve on the mandrel. Upward movement of the key retainer is limited by the engagement of its upper end with the lower end of the expander mandrel section 15. A lock ring 41 may be threaded on the lower end of the lower mandrel section also to limit downward movement of the key retainer.

As is more fully set forth in the patent to Miller, No. 2,673,614, the selector keys 31 are provided with selector bosses 44 which are of such dimensions as to move into expanded positions in a selector recess 45 of like configuration provided in a selected one of any number of landing nipples 23 which may be connected at different levels in the tubing string. The bosses 44 have abrupt downwardly facing lower shoulders 46 adapted to engage the upwardly facing shoulder 47 of the selected landing nipple when the selector keys move into expanded positions into the selector recess of such landing nipple. The upper ends of the bosses have upwardly and inwardly extending cam shoulders 48 which are adapted to cam the keys inwardly to retracted positions upon upward movement of the anchoring device in a well flow conductor upon meeting such downwardly facing obstructions as the downwardly facing shoulders of the upper end of the various recesses of the landing nipples. The selector keys are also provided with guide bosses 52 having outwardly convergent upper and lower shoulders which are adapted to enter into the guide recess 53 of the landing nipple.

The main flow control device 10 includes a control mandrel 60 whose upper end is threaded on the lower end of the anchoring mandrel 13 whereby it is secured to the anchoring and sealing device 12. The control mandrel 60 includes a pair of identical upper and lower mandrel sections 61 and 62, respectively, threadedly connected to opposite ends of a packing mandrel 63. The upper mandrel section has a lateral port 65 which communicates with the internal bore 66 of the control mandrel and with the exterior thereof.

A seal retainer sleeve 68 is disposed about the upper mandrel section and has an internal flange at its lower end threaded on the lower end of the upper mandrel section to provide an upwardly facing annular shoulder 69 which limits downward movement of a sleeve seal 70 on the upper mandrel section. Upward movement of the sleeve seal is limited by the downwardly facing shoulder 72 of the upper mandrel section. The sleeve seal has an outwardly tapered upper end or lip which is adapted to abut the inner surfaces of the retainer sleeve 68 adjacent and above the slots 75. The upper end of the retainer sleeve extends above the enlarged upper end portion of the upper mandrel section 61 and abuts the downwardly facing shoulder 76 thereof which limits upward movement of the retainer sleeve on the upper mandrel section. An O-ring or seal element 77 disposed in an external annular recess of the upper mandrel section seals between the retainer sleeve and the upper mandrel section above the port 65 thereof. It will thus be apparent that fluids may flow inwardly to the bore 66 of the control mandrel 60 through the slots 75 of the retainer sleeve, which flow deflects the upper end of the sleeve seal 70 inwardly to permit fluid flow into the annular space 78 between the upper mandrel section and the retainer sleeve, and thence through the flow port 65 into the bore. Flow of fluids from the bore of the control mandrel is prevented since any such movement will cause the upper end of the sleeve seal to move into sealing engagement with the retainer sleeve above and adjacent the slots 75 to close the slots.

It will thus be apparent that the seal element functions as a check valve to permit flow of fluids into the bore 66 through the flow port 65 but prevents any reverse flow from the bore outwardly through the flow port.

The lower mandrel section 62 is provided with an identical retainer sleeve 80 and check valve or sleeve seal 81 which controls flow of fluids through the slots 82 of the lower retainer sleeve and the flow ports 85 of the lower mandrel section into the longitudinal bore 66 of the control mandrel. The O-ring or seal element 86 disposed in an external annular recess of the lower mandrel section seals between the lower mandrel section and the retainer sleeve above the flow port 85.

A skirt 88 is threaded on the lower end of the lower mandrel section and has a plug 90 releasably secured therein by a shear pin 91 which extends through aligned apertures in the skirt and in the plug. The plug has an upward extension telescopable into the lower end of the lower mandrel section and provided with an external annular recess for receiving an O-ring 92 which seals between the plug and the lower mandrel section to prevent flow of fluids therebetween. The skirt is provided with a plurality of lateral apertures 93 through which fluids may flow between the bore 66 of the control mandrel and the exterior of the skirt when the plug has been moved to its lower position. A plurality of lower apertures 94 are also provided in the skirt below the port 93 which permit egress of fluids from the skirt below the plug during downward movement of the plug in the skirt in the event that another well tool is secured to the lower threaded end of the plug which closes the bore of the skirt.

The packer mandrel 63 has a packing assembly 95 whose upward movement on the packer mandrel is limited by the downwardly facing annular shoulder 96 of the packer mandrel while its downward movement is limited bya retainer ring 97 threaded on the lower portion of the packer mandrel above the upper end of the lower mandrel section.

The tubing string T is composed of the usual tubing sections 100 which are coupled together by collars 101. In addition, the landing nipple 23, the port coupling 102 and a connector 103 are serially connected in the tubing string by means of the usual collars 101. The port coupling 102 is provided with a plurality of ports 105 which, when the anchoring device 12 is locked in the landing nipple, communicate with the slots 75 of the retainer sleeve and lateral ports 65 of the control mandrel. The packing assembly 95 then seals between the connector 103 and the packing mandrel 63 below the ports 105 while the packer assembly 25 of the anchoring device seals between the packer mandrel and the landing nipple above the ports 105 so that fluid which flows through these ports may flow only into the bore 66 of the control mandrel and thence upwardly through the bore 110 of the mandrel of the anchoring device to the tubing string above the anchoring device. Similarly, any fluid flowing upwardly in the tubing string below the packing assembly 95 of the flow control device can flow into the bore 66 of the control mandrel only through the slots 82 of the lower retainer sleeve and the ports 85. The well in which the tubing string is disposed is so completed that the ports 105 of the port coupling 102 communicates with one producing zone while the slots 82 of the lower mandrel section communicates with the other of the fluid producing zones of the well. This can be accomplished by using a tubing-casing packer between the two zones. As a result, the only manner in which the fluids from the two producing zones of the well may move upwardly through the tubing string above the flow control device is through the slots 75 and 82 of the upper and lower retainer sleeves of the flow control device.

In use, the flow control device 10 is first secured to the anchoring device 12 in the manner described and the anchoring well tool in turn is connected to a suitable running tool and flexible line by which means it is lowered into the tubing string T. During such movement of this well tool assembly, the selector keys 31 are biased outwardly by their springs 37 and engage the internal surfaces of the tubing string. The selector keys, however, cannot move into expanded positions even when passing through higher landing nipples 23 of the tubing string until the anchoring well tool enters into a preselected landing nipple whose selector recess 45 is of a configuration corresponding to the configuration of the bosses 44 of the anchoring device whereupon the keys move outwardly into expanded positions into the selector recess of such preselected landing nipple. Downward movement of the mandrel 13 of the anchoring device is then prevented by the engagement of the downwardly facing shoulders 46 of the selector keys with the upwardly facing shoulder 47 of the selector recess of the landing nipple. Upward jars are then applied through the running tool to the upper end of the mandrel 13 of the anchoring device to cause the mandrel to move upwardly relatively to the dogs 18, which are now aligned with the locking recess 22 of the landing nipple, to cause the dogs to be biased outwardly into their expanded positions into the locking recess, as is more fully explained in the patent to Miller, No. 2,673,614, whereupon the anchoring device prevents further upward or downward movement of the anchoring device in the landing nipple. The packing assembly 25 then seals between the anchoring device mandrel and the landing nipple.

The slots 75 of the upper retainer sleeve of the main flow control device are then in communication with the lateral ports 105 of the coupling 102 while the slots 82 of the lower mandrel section of the flow control device are in communication with the flow passage of the tubing string T below the packing assembly 95 of the flow control device. The flow control device now permits flow of fluids from two producing zones into the bore 66 of the flow control device and thence through the bore 110 of the anchoring device to the flow passage of the tubing string above a packing assembly 25 of the anchoring device but, due to the action of the check valves 70 and 81, reverse flow of fluids from the well tubing into either of the producing zones is prevented thereby.

If it should now be desired to remove the flow control device from the tubing string a suitable pulling tool is lowered into the tubing string to engage the undercut shoulder 112 at the upper end of the dog hanger 17 and also deliver a downward blow to the plug 90 to shear the pin 91 and move the plug downward to open the apertures 93 and to the upper end of the upper mandrel section 14 of the anchoring device to move the expander surface 20 downwardly of the dogs 18 whereby a subsequent upward pull imparted to the upper end of the dog hanger by means of the undercut flange 112 will cause the dog hanger to move upwardly on the anchoring device mandrel, the dogs moving inwardly to retracted positions upon such upward movement of the dog hanger on the mandrel. Continued upward movement of the dog hanger then causes its upper end to engage the downwardly facing shoulder 113 of the mandrel whereupon further upward movement of the dog hanger will result in simultaneous upward movement of the mandrel 13 whereby the anchoring device and the well flow control device are removed together upwardly from the tubing string. The ports 93 of the skirt now being open, fluid flow may take place through the bores 66 and 110 of the main flow control device and the anchoring device to facilitate passage of the assembly through the tubing string. The upper bevelled shoulders of the dogs and of the selector keys and guide bosses cam the dogs and the selector keys inwardly upon meeting downwardly facing obstructions in the tubing string.

If, on the other hand, it is desired to adjust or control the flow from the two producing formations through the tubing string in a particular ratio of the rates of flow from the two producing zones, or if it is desired that the pressure of one of the zones be utilized to lift or forced to the surface the fluid produced by the other of the two producing zones, whose pressure may have dropped off to the point where the fluid from such low pressure zone will not of itself flow to the surface of the well, the ports 65 and 85 are provided with orifices of preselected relative sizes or an auxiliary flow control device 125 is lowered into the well to be releasably connected to the upper mandrel section 14 of the anchoring device. The auxiliary flow control device is preferred since the ratio of rate of flow from the two producing zones may be changed without removing the check valves which thus at all times prevent communication between the two producing zones.

The auxiliary flow control device 125 includes a top sub 126 having an external flange 127 at its upper end which provides a downwardly facing undercut shoulder 128. A tubular body 130 is disposed in the top sub 126 for limited movement therein and has a plurality of longitudinal radially inwardly extending outer slots 131. A collet 133 threadedly connected to the tubular body has resilient collet fingers 135 which are provided at their lower ends with external bosses 136 having outwardly convergent upper and lower shoulders. The collet fingers also have internal bosses 137 which provide inwardly convergent upper and lower shoulders.

Figure 3:
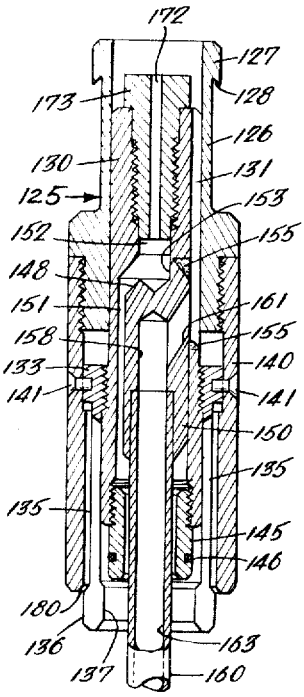
FIGURE 3 is a sectional view, taken on line 3—3 of FIGURE 4, of an auxiliary flow control device.

A locking sleeve 140 is threaded on the top sub 126 and the collet 133 is releasably secured to the locking sleeve 140 by a shear pin 141. The lower ends of the collet fingers are disposed below the lower end of the locking sleeve, as illustrated in FIGURE 3 when the collet is secured to the lock sleeve. The top sub and locking sleeve are adapted to move downwardly, when the shear pin is sheared, to a position wherein the lower end of the locking sleeve telescopes over and engages the external bosses 136 at the lower ends of the collet fingers to prevent them from flexing outwardly toward expanded positions. Longitudinal movement of the top sub and locking sleeve relative to the tubular body 130 and the collet 133 is limited in one direction by the engagement of the upper end of the collet with the bottom end of the top sub 126 and in the other direction by the engagement of the external annular flange of the collet with an upwardly facing annular shoulder 142 of the locking sleeve.

An extension 145 is threaded into tubular body 130 and is adapted to telescope into the upper end of the top section 14 of the anchoring device mandrel 13. An O-ring or seal element 146 is disposed in an external annular recess of the extension to seal between the extension and the anchor device mandrel.

The tubular body 130 has a longitudinal bore 148 in which a cross-over insert 150 is disposed. The cross-over insert is substantially rectangular in shape to provide a flow passage 151 on either side thereof in the bore of the tubular body which communicate with the upper reduced bore portion 152 of the bore of the tubular body, the insert having a transverse slot 153 at its upper end to allow such communication of the passages 151 with the reduced upper bore portion. The cross-over insert 150 is secured to the tubular body by any suitable means, as by welds 155. The cross-over body has a longitudinal bore 158 into whose open lower end is telescoped an extension tube 160 and secured therein by any suitable means, such as welds. The upper end of the insert bore 158 communicates with the longitudinal slots or grooves 131 of the tubular body through the ports 161.

The extension tube has a bore 163 which opens at its lower end into the bore 66 of the flow control mandrel 60 below the flow ports 65 of the upper mandrel section 61. The extension tube is provided at its lower end with an external annular flange 164 having a pair of external annular recesses in which are disposed O-rings or sealing means 165 to seal between the upper mandrel section 61 and the flange [165] *164* to prevent flow of fluid therebetween.

The extension tube 160 together with the mandrels of the anchoring device 12 and the flow control device 10 forms an annular flow passage 170 which at its lower end communicates with flow ports 65 of the upper mandrel section and at its upper end with the flow passages 151 formed in the bore of the tubular body 130 of the auxiliary flow control device by the cross-over insert 150 so that fluid from one producing zone which enters through the ports 105 of the tubing string T may flow upwardly through the annular passage 170 and the flow passages 151 to the upper end of the bore of the tubular body [30] *130* and thence through the restricted orifice 172 of a bean 173, threaded into the reduced upper portion of the bore of the tubular body 130, to the tubing string above the auxiliary flow control device.

The lower end of the extension tube has a bean 175 threaded in the lower end thereof which provides a restricted orifice 176 so that fluid entering into the flow control device bore 66 through the flow ports 85 of the lower mandrel section 62 from another producing zone flows upwardly through a flow passage formed by the bore 66 of the mandrel of the flow control device 10, the bore or orifice 176 of the lower bean, the bore 163 of the tube extension, the bore 158 of the cross-over insert, the bypass ports 161 of the cross-over body and the longitudinal slots 131 of the tubular body.

If the fluids of the two producing zones are of sufficient pressure that each will flow to the surface of the well without assistance, and if it is desired that the production of well fluids from the two zones of the well be in a particular proportion or ratio to one another, beans 173 and 175 are selected which have orifices 172 and 176 of such dimensions, depending on the relative pressures of the fluids of the two producing zones, that the rate of production of well fluids from the two zones through such orifices will be in the desired ratio. For example; if it is desired that the producing zone having the greater pressure should flow fluids to the surface of the well at the same rate as the zone having the lower pressure and if it is assumed that the fluid from the producing zone having the greater pressure enters into the mandrel 60 of the flow control device through the lower ports 85, a bean 175 is connected to the lower end of the tube extension which has a smaller effective orifice than the orifice 172 of the bean 173, the relative disproportion in the sizes of these two orifices being varied in accordance with the disproportion in the pressures of the two producing zones.

In use, when it is desired to connect the auxiliary flow device to the anchoring device and main flow control device assembly which is already locked in the tubing string as described above, a running tool is connected to the top sub 126 of the auxiliary flow control device by means of its undercut shoulder 128 and lowered into the well, by means of a flexible line connected to the running tool, with the lower ends of the collet fingers disposed below the locking sleeve 140 and held in such position by the shear pin 141. When the auxiliary flow control device reaches the upper end of the mandrel 13 of the anchoring device, extension tube 160 enters bore 110 of the anchoring device, after which the auxiliary flow control device is further lowered until the inwardly and upwardly extending shoulders of the internal bosses 137 at the lower ends of the collet fingers bias the collet fingers outwardly upon their engagement with the upper end of the anchoring device mandrel and, upon further downward movement of the auxiliary flow control device, the internal bosses 137 move downwardly below the flange 114 of the upper end of the anchoring device mandrel. The upper inwardly and downwardly bevelled shoulders of the internal bosses then engage the upwardly and outwardly bevelled shoulder 113 provided by the flange 114. At this time the lower end of the tubular body engages the upper end of the anchoring device mandrel and thus limits further downward movement of the tubular body 130 relative to the anchoring device mandrel.

Downward jars are then imparted by means of the running tool to the top sub to shear the pin 141 and move the top sub and lock sleeve downwardly relative to the collet whereupon the upwardly and inwardly bevelled shoulder 180 of the lock sleeve engages the downwardly and outwardly extending upper shoulders of the external bosses 136 of the collet fingers to move the internal bosses into locking engagement with the upper mandrel section below the flange 114 thereof. The locking sleeve thus holds the auxiliary flow control device locked in position on the mandrel of the anchoring device.

Figure 5:
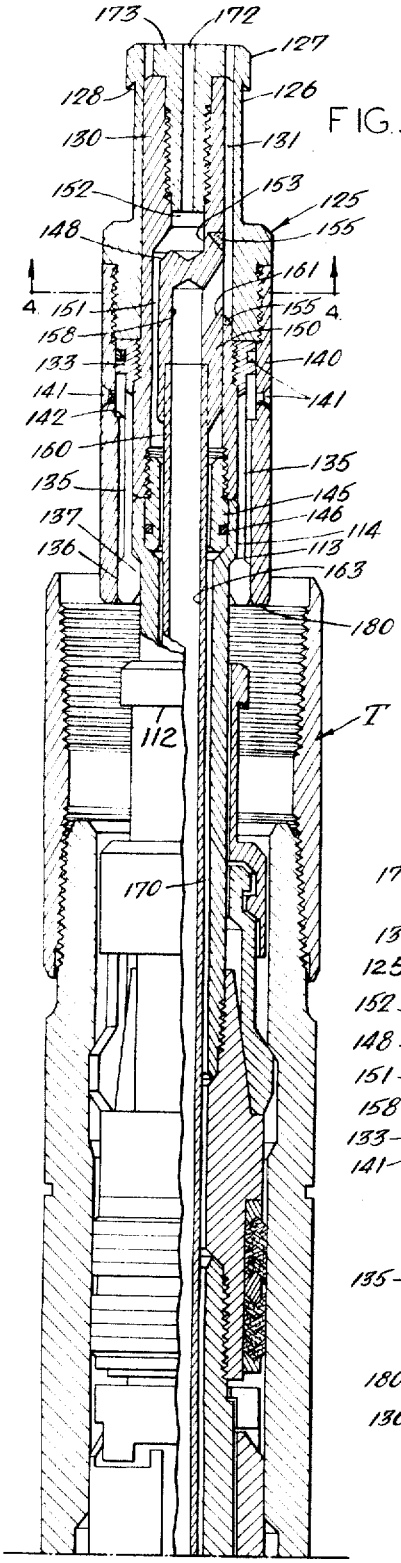
FIGURE 5 is a view similar to FIGURE 1 showing the auxiliary flow device connected to the well tool illustrated in FIGURE 1, the sectional view of the auxiliary flow control device being similar to FIGURES 3.
Figure 6:
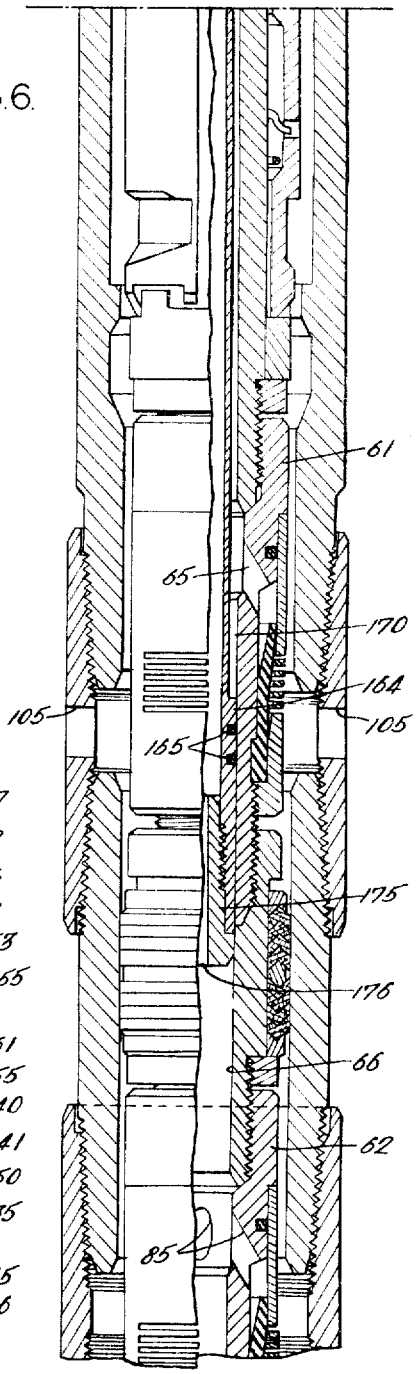
FIGURE 6 is a view similar to FIGURE 5, being a continuation thereof, and showing the lower portions of the well tool and auxiliary flow control device.

During the downward movement of the auxiliary flow control device relative to the anchoring device and the main flow control device, the tube extension 160 moves downwardly into the mandrels of the anchoring device and of the well flow control device until it attains the position illustrated in FIGURES 3 and 5. As the lower ends of the collet fingers move downwardly over the upper end of the anchoring device mandrel, the extension 145 of the tubular body 130 of the auxiliary flow device telescopes into the enlarged upper bore portion of the anchoring device mandrel and its O-rings 146 seal therebetween.

When it is desired to remove the auxiliary flow control device from the well, a pulling tool is lowered into the well which engages the undercut shoulder 128 at the upper end of the top sub 126 of the auxiliary flow control device and an upward pull is then imparted to the top sub to move it upwardly relative to the tubular body 130. Such upward movement causes the lock sleeve 140 to move upwardly out of engagement with the external bosses 136 of the collet fingers to permit them to move outwardly out of locking engagement with the downwardly facing shoulder 113 of the anchoring device mandrel. Continued upward movement of the top sub then causes the upwardly facing shoulder 142 of the lock sleeve to engage the lower side of the collet so that thereafter the sub, collet and tubular body move upwardly as a unit. The collet fingers are cammed out of locking engagement with the flange 114 of the anchoring device mandrel due to the camming action between the upwardly and outwardly extending upper shoulders of the internal bosses 137 of the collet fingers and the upwardly and outwardly extending shoulder 113 of the flange 114 of the anchoring device. The pulling tool and auxiliary flow control device are then removed upwardly through the well.

After the auxiliary flow control device has been removed from the tubing string, the main flow control device may be removed in the manner described above.

It will be apparent that the mandrel 13 of the anchoring device and the mandrel 60 of the main well flow control device may be considered to be a single member or mandrel having a continuous longitudinal flow passage therethrough and a lateral port communicating with the flow passage and also being the releasable locating and locking means for locking the mandrel in a predetermined position in a well flow conductor. It will be further seen that such mandrel is provided with packing assemblies 25 and 95 which seal above and below the lateral port of the mandrel and the well flow conductor, the lateral port of the mandrel being in communication with a lateral port of the well flow conductor, and that the lower portion of the bore of the mandrel below the lower packing assembly 95 communicates with the interior of the well flow conductor.

It will further be apparent that the mandrel has check valve means for permitting flow of fluids into the bore below the lower packing assembly and through the lateral ports in one direction only.

It will now be seen that the auxiliary well control device cooperates with the main flow control device 10 and the anchoring device 11 to form a pair of flow passages, one of which communicates with the tubing string below the packer assembly 95 and which opens upwardly through the longitudinal slots 131 of the tubular body 130 of the auxiliary flow control device and the other one of which communicates with the exterior of the tubing string through the lateral port 105 of the tubing string, above the packing 95 of the main flow control device and below the packing 25 of the anchoring device, and opens upwardly into the tubing string through the orifice 172 of the bean 173.

It will further be seen that both of these flow passages are provided with check valves which prevent reverse flow of fluids from the flow control devices into the producing zones.

It will further be seen that by proper selection of the effective orifices of the two beans the ratio of rates of flow from two producing zones, if each is capable of producing fluids under its own pressure to the surface of the well, may be adjusted to any desired value.

It will further be seen that the provision of an auxiliary flow control device whose two flow passages open upwardly into the tubing string adjacent one another provides for an action which enables a producing zone of greater pressure to aid or be effective in producing well fluids from a zone having a lesser pressure without any external aid or force being applied.

It will also be seen that the auxiliary flow control device includes a sub and a tubular body releasably connected to the upper end of the mandrel of the anchoring device to form two flow passages through which fluids from two producing zones may be individually moved to the tubing string above the well assembly.

It will further be seen that the releasable means include a collet having resilient fingers which are engageable with the downwardly facing shoulder of the top mandrel section of the anchoring device and that a lock sleeve is movable about the fingers to hold the auxiliary flow control device locked in operative position on the mandrel of the anchoring device.

It will further be seen that the auxiliary flow device is provided at its upper end with a pair of upwardly opening passages which in conjunction with the anchoring device and the main flow control device form two separate flow passages for the flow of well fluids from the two producing zones.

The foregoing description of the invention is explanatory only, and changes in the details of the construction illustrated may be made by those skilled in the art, within the scope of the appended claims, without departing from the spirit of the invention.

The invention claimed is:

[1. A flow control device, for a well flow conductor having a longitudinal flow passage and a first lateral port communicating with the flow passage intermediate the ends thereof, including: an elongate mandrel positioned in the well flow conductor and provided with an internal flow passage for communicating at its upper end with the flow passage in the well flow conductor and with a second lateral port intermediate the ends of the mandrel for communicating with the exterior of the mandrel and said internal flow passage and with said first lateral port; seal means carried by the mandrel for sealing between the well flow conductor and the mandrel below said lateral ports, said mandrel having an aperture for communicating with the flow passage of the well flow conductor below the seal means; means carried externally by the mandrel permitting flow in one direction only into the internal flow passage of the mandrel through said second lateral port and said aperture; and seal means on said mandrel for sealing between the mandrel and the well flow conductor above said ports.]

[2. A main flow control device, for a well flow conductor having a longitudinal flow pasasge and a first lateral port communicating with the flow passage intermediate the ends thereof, including: an elongate mandrel positioned in the well flow conductor and provided with an internal flow passage for communicating at its upper end wtih the flow passage in the well flow conductor and with a second lateral port intermediate the ends of the mandrel for communicating with the exterior of the mandrel and said internal flow passage and with said first lateral port; seal means carried by the mandrel for sealing between the well flow conductor and the mandrel below the lateral ports of the well flow conductor and the mandrel; said mandrel having an aperture for communicating with the flow passage of the well flow conductor below the seal means; means carried by the mandrel permitting flow in one direction only into the internal flow passage of the mandrel through said second lateral port and said aperture; and an auxiliary flow control device releasably securable to the upper end of the mandrel having means extending into said internal flow passage providing with said internal flow passage, when the auxiliary flow control device is secured to the main flow control device, a first flow passage communicating with said second lateral port of the mandrel and opening upwardly into the well flow conductor above said first lateral port and providing a second flow passage communicating with said aperture and opening upwardly into the well flow conductor.]

[3. A main flow control device, for a well flow conductor having a longitudinal flow passage and a first lateral port communicating with the flow passage intermediate the ends thereof, including: an elongate mandrel positioned in the well flow conductor and provided with an internal flow passage for communicating at its upper end with the flow passage in the well flow conductor and a second lateral port intermediate the ends of the mandrel for communicating with the exterior of the mandrel and said internal flow passage and with said first lateral port; seal means carried by the mandrel for sealing between the well flow conductor and the mandrel below said lateral ports, said mandrel having an aperture for communicating with the flow passage of the well flow conductor below the seal means; means carried by the mandrel for permitting flow in one direction only into the internal flow passage of the mandrel through said second lateral port and said aperture; seal means on said mandrel for sealing between the mandrel and the well flow conductor above said ports; and an auxiliary flow control device releasably securable to the upper end of the mandrel having means extending into said internal flow passage providing with said flow passage, when the auxiliary flow control device is secured to the main flow control device, a first flow passage communicating with said second lateral port and opening upwardly into the well flow conductor above said first lateral port and providing a second flow passage communicating with said aperture and opening upwardly into the well flow conductor.]

4. A main flow control device, for a well flow conductor having a longitudinal flow passage and a first lateral port communicating with the flow passage intermediate the ends thereof, including: an elongate mandrel positioned in the well flow conductor and provided with an internal flow passage for communicating at its upper end with the flow passage in the well flow conductor and *with* a second lateral port intermediate the ends of the mandrel for communicating with the exterior of the mandrel and said internal flow passage and with said first lateral port; seal means carried by the mandrel for sealing between the well flow conductor and the mandrel below said lateral ports[.] *;* said mandrel having an aperture for communicating with the flow passage of the well flow conductor below the [seals] *seal* means; means carried by the mandrel permitting flow in one direction only into the internal flow passage of the mandrel through said second lateral port and said aperture; seal means on the mandrel for sealing between the mandrel and the well flow conductor above the ports; means carried by the mandrel for releasably securing the mandrel in the well flow conductor; and an auxiliary flow control device releasably securable to the upper end of the mandrel having means extending into said internal flow passage providing[,] with said internal *flow* passage, when the auxiliary flow control device is secured to the main flow control device, a first flow passage communicating with said first lateral port and opening into the well flow conductor above said first lateral port and providing a second flow passage communicating with said aperture and opening into the well flow conductor above said first lateral port; said auxiliary flow control device having means in each of said first and second flow passages providing restricted orifices of predetermined relative sizes.

5. A main flow control device, for a well flow conductor having a longitudinal flow passage and a first lateral port communicating with the flow passage intermediate the ends thereof, including: an elongate mandrel positioned in the well flow conductor and provided with an internal flow passage for communicating at its upper end with the flow passage [of] *in* the well flow conductor and *with* a second lateral port intermediate the ends of the mandrel for communicating with the exterior of the mandrel and said internal flow passage and with said first lateral port; seal means carried by the mandrel for sealing between the well flow conductor and the mandrel below said lateral ports[.]; said mandrel having an aperture *for* communicating with the flow passage of the well flow conductor below the seal means; [means carried by the mandrel permitting flow in one direction only into the internal flow passage of the mandrel through said second lateral port and said aperture;] and an auxiliary flow control device releasably securable to the upper end of the mandrel having means extending into said internal flow passage providing with said internal flow passage, when the auxiliary flow control device is secured to the main flow control device, a first flow passage communicating with said second lateral port and opening into the well flow conductor above said first lateral port and providing a second flow passage communicating with said aperture and opening into the well flow conductor above said first lateral port[,]; *means carried by the mandrel (a) permitting flow in one direction only into the internal flow passage of the mandrel through said second lateral port when said auxiliary flow control device is secured to the main flow control device and (b) preventing flow from said last-named flow passage through said second lateral port when said auxiliary flow control device is not secured to said main flow control device; means carried by the mandrel permitting flow in one direction only into the internal flow passage of the mandrel through said aperture when said auxiliary flow control device is secured to the main flow control device;* and means in each of said first and second flow passages providing restricted orifices of predetermined relative sizes.

6. A main flow control device, for a well flow conductor having a longitudinal flow passage and a first lateral port communicating with the flow passage intermediate the ends thereof, including: an elongate mandrel positioned in the well flow conductor and provided with an internal flow passage for communicating at its upper end with the flow passage in the well flow conductor and *with* a second lateral port intermediate the ends of the mandrel for communicating with the exterior of the mandrel and said internal flow passage and with said first lateral port; seal means carried by the mandrel for sealing between the well flow conductor and the mandrel below said lateral ports[,]; said mandrel having an aperture *for* communicating with the flow passage of the well flow conductor below the seal means; seal means on the mandrel for sealing between the mandrel and the well flow conductor above the ports; [means carried by the mandrel permitting flow in one direction only into the internal flow passage of the mandrel through said second lateral port and said aperture;] and an auxiliary flow control device releasably securable to the upper end of the mandrel having means extending into said internal flow passage providing with said internal flow passage, when the auxiliary flow control device is secured to the main flow control device, a first flow passage communicating with said second lateral port and opening upwardly into the well flow conductor above said first lateral port and providing a second flow passage communicating with said aperture and opening upwardly into the well flow conductor[,]; *means carried by the mandrel (a) permitting flow in one direction only into the internal flow passage of the mandrel through said second lateral port when said auxiliary flow control device is secured to the main flow control device and (b) preventing flow from said last-named flow passage through said second lateral port when said auxiliary flow control device is not secured to said main flow control device; means carried by the mandrel permitting flow in one direction only into the internal flow passage of the mandrel through said aperture when said auxiliary flow control device is secured to the main flow control device;* and means in each of said first and second flow passages providing restricted orifices of predetermined [relataive] *relative* sizes.

7. A main flow control device, for a well flow conductor having a longitudinal flow passage and a first lateral port communicating with the flow passage intermediate the ends thereof, including: an elongate mandrel positioned in the well flow conductor and provided with an internal flow passage for communicating at its upper end with the flow passage in the well flow conductor and *with* a second lateral port intermediate the ends of the mandrel communicating with the exterior of the mandrel and said internal flow passage and with said first lateral port; seal means carried by the mandrel for sealing between the well flow conductor and the mandrel below said lateral ports[,]; said mandrel having an aperture for communicating with the flow passage of the well flow conductor below the seal means; means carried by the mandrel permitting flow in one direction only into the internal flow passage of the mandrel through said second lateral port and said aperture; said mandrel having an aperture for communicating with the flow passage of the well flow conductor below the seal means; means carried by the mandrel permitting flow in one direction only into the internal flow passage of the mandrel through said second lateral port and said aperture; and an auxiliary flow control device releasably securable to the upper end of the mandrel having means extending into said internal flow passage providing with said internal flow passage, when the auxiliary flow control device is secured to the main flow control device, a first flow passage communicating with said second lateral port and opening into the well flow conductor above said first lateral port and providing a second flow passage communicating with said aperture and opening into the well flow conductor above said first lateral port; said means providing said flow passages comprising a tube extension telescopable into said mandrel and having its lower end communicating with the aperture of the mandrel.

8. A main flow control device, for a well flow conductor having a longitudinal flow passage and a first lateral port communicating with the flow passage intermediate the ends thereof, including: an elongate mandrel positioned in the well flow conductor and provided with an internal flow passage for communicating at its upper end with the flow passage in the well flow conductor and *with* a second lateral port intermediate the ends of the mandrel for communicating with the exterior of the mandrel and said internal flow passage and with said first lateral port; seal means carried by the mandrel for sealing between the well flow conductor and the mandrel below said lateral ports[,]; said mandrel having an aperture for communicating with the flow passage of the well flow conductor below the seal means; means carried by the mandrel permitting flow in one direction only into the internal flow passage of the mandrel through said second lateral port and said aperture; seal means on said mandrel for sealing between the mandrel and well flow conductor above said ports; and an auxiliary flow control device releasably securable to the upper end of the mandrel having means extending into said internal flow passage providing with said internal flow passage, when the auxiliary flow control device is secured to the main flow control device, a first flow passage communicating with said second lateral port and opening into the well flow conductor above said first lateral port and providing a second flow passage communicating with said aperture and opening into the well flow conductor above said first lateral port [and]; *said* means providing said flow passages comprising a tube extension telescopable into said mandrel and having its lower end communicating with the aperture of the mandrel.

9. A main flow control device, for a well flow conductor having a longitudinal flow passage and a first lateral port communicating with the flow passage intermediate the ends thereof, including: an elongate mandrel positioned in the well flow conductor and provided with an internal flow passage for communicating at its upper end with the flow passage in the well flow conductor and *with* a second lateral port intermediate the ends of the mandrel communicating with the exterior of the mandrel and said internal flow passage and with said first lateral port; seal means carried by the mandrel for sealing between the well flow conductor and the mandrel below said lateral ports[,]; said mandrel having an aperture *for* communicating with the flow passage of the well flow conductor below the seal means; means carried by the mandrel permitting flow in one direction only into the internal flow passage of the mandrel through said second lateral port and said aperture; and an auxiliary flow control device releasably securable to the upper end of the mandrel having means extending into said internal flow passage providing with said internal flow passage, when the auxiliary flow control device is secured to the main flow control device, a first flow passage communicating with said second lateral port and opening into the well flow conductor above said first lateral port and providing a second flow passage communicating with said aperture and opening into the well flow conductor above said first lateral port; said means providing said flow passages comprising a tube extension telescopable into said mandrel and having its lower end communicating with the aperture of the mandrel [,]; and seal means between the mandrel and the tube extension disposed between said second lateral port and the aperture of the mandrel.

10. A main flow control device, for a well flow conductor having a longitudinal flow passage and a first lateral port communicating with the flow passage intermediate the ends thereof, including: an elongate mandrel positioned in the well flow conductor and provided with an internal flow passage for communicating at its upper end with the flow passage in the well flow conductor and *with* a second lateral port intermediate the end of the mandrel for communicating with the exterior of the mandrel and said internal flow passage and with said first lateral port; seal means carried by the mandrel for sealing between the well flow conductor and the mandrel below said lateral ports[,]; said mandrel having an aperture for communicating with the flow passage of the well flow conductor below the seal means; means carried by the mandrel permitting flow in one direction only into the internal flow passages of the mandrel through said second lateral port and said aperture; seal means on said mandrel for sealing between the mandrel and the well flow conductor above said ports; and an auxiliary flow control device releasably securable to the upper end of the mandrel having means extending into said internal flow passage providing with said internal flow passage, when the auxiliary flow control device is secured to the main flow control device, a first flow passage communicating with said second lateral port and opening into the well flow conductor above said first lateral port and providing a second flow passage communicating with said aperture and opening into the well flow conductor above said first lateral port, said means providing said flow passages comprising a tube extension telescopable into said mandrel and having its lower end communicating with the aperture of the mandrel[,]; and seal means between the mandrel and the tube extension disposed between said lateral port and the aperture of the mandrel.

11. A main flow control device, for a well flow conductor having a longitudinal flow passage and a first lateral port communicating with the flow passage intermediate the ends thereof, including: an elongate mandrel positioned in the well flow conductor and provided with an internal flow passage for communicating at its upper end with the flow passage in the well flow conductor and *with* a second lateral port intermediate the ends of the mandrel for communicating with the exterior of the mandrel and said internal flow passage and with said first lateral port; seal means carried by the mandrel for sealing between the well flow conductor and the mandrel below said lateral ports[,]; said mandrel having an aperture *for* communicating with the flow passage of the well flow conductor below the seal means; [means carried by the mandrel permitting flow in one direction only into the internal flow passage of the mandrel through said second lateral port and said aperture;] and an auxiliary *flow* control device *releasably* securable to the upper end of the mandrel having means extending into said internal flow passage providing with said internal flow passage, when the auxiliary flow control device is secured to the main flow control device, a first flow passage communicating with said second lateral port and opening into the well flow conductor above said first lateral port and providing a second flow passage communicating with said aperture and opening into the well flow conductor above said first lateral port; the mandrel being provided with a downwardly facing shoulder at the upper end thereof, the auxiliary flow control device having means for engaging the downwardly facing shoulder to releasably secure the auxiliary flow control device to the mandrel; *means carried by the mandrel (a) permitting flow in one direction only into the internal flow passage of the mandrel through said second lateral port when said auxiliary flow control device is secured to the main flow control device and (b) preventing flow from said last-named flow passage through said second lateral port when said auxiliary flow control device is not secured to said main flow control device; means carried by the mandrel permitting flow in one direction only into the internal flow passage of the mandrel through said aperture when said auxiliary flow control device is secured to the main flow control device; and means in each of said first and second flow passages providing restricted orifices of predetermined relative sizes.*

12. A main flow control device, for a well flow conductor having a longitudinal flow passage and a first lateral port communicating with the flow passage intermediate the ends thereof, including: an elongate mandrel positioned in the well flow conductor and provided with an internal flow passage for communicating at its upper end with the flow passage in the well flow conductor and *with* a second lateral port intermediate the ends of the mandrel communicating with the exterior of the mandrel and said internal flow passage and with said first lateral port; seal means carried by the mandrel for sealing between the well flow conductor and the mandrel below said lateral ports[,]; said mandrel having an aperture for communicating with the flow passage of the well flow conductor below the seal means[,]; [means carried by the mandrel permitting flow in one direction only into the internal flow passage of the mandrel through said second lateral port and said aperture;] seal means on said mandrel for sealing between the mandrel and the well flow conductor above said ports; and an auxiliary flow control device releasably securable to the upper end of the mandrel having means extending into said internal flow passage providing with said internal flow passage, when the auxiliary flow control device is secured to the main flow control device, a first flow passage communicating with said second lateral port and opening into the well flow conductor above said first lateral port and providing a second flow passage communicating with said aperture and opening into the well flow conductor above said first lateral port[,]; the mandrel being provided with a downwardly facing shoulder at the upper end thereof, the auxiliary flow control device having means for engaging the downwardly facing shoulder to releasably secure the auxiliary flow control device to the mandrel; *means carried by the mandrel (a) permitting flow in one direction only into the internal flow passage of the mandrel through said second lateral port when said auxiliary flow control device is secured to the main flow control device and (b) preventing flow from said last-named flow passage through said second lateral port when said auxiliary flow control device is not secured to said main flow control device; means carried by the mandrel permitting flow in one direction only into the internal flow passage of the mandrel through said aperture when said auxiliary flow control device is secured to the main flow control device; and means in each of said first and second flow passages providing restricted orifices of predetermined relative sizes.*

13. A main flow control device, for a well flow conductor having a longitudinal flow passage and a first lateral port communicating with the flow passage intermediate the ends thereof, including: an elongate mandrel positioned in the well flow conductor and provided with an internal flow passage for communicating at its upper end with the flow passage in the well flow conductor and *with* a second lateral port intermediate the ends of the mandrel for communicating with the exterior of the mandrel and said internal flow passage and with said first lateral port; seal means carried by the mandrel for sealing between the well flow conductor and the mandrel below said lateral ports[.]; said mandrel having an aperture *for* communicating with the flow passage of the well flow conductor below the seal means; [means carried by the mandrel permitting flow in one direction only into the internal flow passage of the mandrel through said second lateral port and said aperture;] seal means on said mandrel for sealing between the mandrel and the well flow conductor above said ports; and an auxiliary flow control device releasably securable to the upper end of the mandrel having means extending into said internal flow passage providing with said internal flow passage, when the auxiliary flow control device is secured to the main flow control device, a first flow passage communicating with said second lateral port and opening into the well flow conductor above said first lateral port and a second flow passage communicating with said aperture and opening into the well flow conductor above said first lateral port; the mandrel being provided with a downwardly facing shoulder at the upper end thereof, the auxiliary flow control device having means for engaging the downwardly facing shoulder to releasably secure the auxiliary flow control device to the mandrel; lock means on the auxiliary flow control device for holding the releasable means against disengagement from the downwardly facing shoulder; *means carried by the mandrel (a) permitting flow in one direction only into the internal flow passage of the mandrel through said second lateral port when said auxiliary flow control device is secured to the main flow control device and (b) preventing flow from said last-named flow passage through said second lateral port when said auxiliary flow control device is not secured to said main flow control device; means carried by the mandrel permitting flow in one direction only into the internal flow passage of the mandrel through said aperture when said auxiliary flow control device is secured to the main flow control device; and means in each of said first and second flow passages providing restricted orifices of predetermined relative sizes.*

14. A main flow control device, for a well flow conductor having a longitudinal flow passage and a first lateral port communicating with the flow passage intermediate the ends thereof, including: an elongate mandrel positioned in the well flow conductor and provided with an internal flow passage for communicating at its upper end with [a] *the* flow passage in the well flow conductor and *with* a second lateral port intermediate the ends of the mandrel for communicating with the exterior of the mandrel and said internal flow passage and with said first lateral port; seal means carried by the mandrel for sealing between the well flow conductor and the mandrel below said lateral ports[.]; said mandrel having an aperture for communicating with the flow passage of the well flow conductor below the seal means; means carried by the mandrel permitting flow in one direction only into the internal flow passage of the mandrel through said second lateral port and said aperture; seal means on said mandrel for sealing between [th] *the* mandrel and the well flow conductor above said lateral ports; and an auxiliary flow control device releasably securable to the upper end of the mandrel having means extending into said internal flow passage providing with said internal flow passage, when the auxiliary flow control device is secured to the main flow control device, a first flow passage communicating with said second lateral port and opening into the well flow conductor above said first lateral port and providing a second flow passage communicating with said aperture and opening into the well flow conductor above said first lateral [ports] *port*, said means providing said flow passages comprising a tube extension telescopable into said mandrel and having its lower end communicating with the aperture of the mandrel, said [main] auxiliary *flow control* device having a body provided with a pair of upwardly opening flow passages, one of said passages of the body communicating with said tube extension, the tube extension and the mandrel forming an annular passage communicating with said second lateral port, the other of said passages of the body communicating with said annular passage.

15. A main flow control device for a well flow conductor having a longitudinal flow passage and having means providing a first flow opening and a second flow opening from the exterior of said conductor to the flow passage thereof at longitudinally spaced locations, said main flow control device including: a mandrel having a flow passage positionable in the well flow conductor, said mandrel having first inlet means providing communication between said flow passage of said mandrel and said first flow opening of said conductor and second inlet means providing communication between said flow passage of said mandrel and said second flow opening of said conductor for directing flow from said flow openings unidirectionally into the flow passage of the mandrel and thence upwardly into the flow passage of the well flow conductor; and an auxiliary flow control device securable to the upper end of the mandrel and having means forming with the mandrel a pair of flow passages each communicating with one of said inlet means, said pair of flow passages opening upwardly adjacent one another into the flow passage of the well flow conductor.

16. A main flow control device for a well flow conductor having a longitudinal flow passage and having means providing a first flow opening and a second flow opening from the exterior of said conductor to the flow passage thereof at longitudinally spaced [positions] *locations*, said main flow control device including: a mandrel having a flow passage positionable in the well flow conductor [, said mandrel having first inlet means providing communication between said flow passage of said mandrel and said first flow opening of said conductor and second inlet means providing communication between said flow passage of said mandrel and said second flow opening of said conductor for directing flow from said flow openings unidirectionally into the flow passage of the mandrel and thence upwardly into the flow passage of the well flow conductor]; and an auxiliary flow control device *releasably* securable to the upper end of the mandrel [and having means forming with the mandrel a pair of flow passages each communicating with one of a separate one of said inlet means]; *said mandrel having first inlet means (a) permitting flow in one direction only into the flow passage of the mandrel through said first flow opening of said conductor and thence upwardly into the flow passage of the well flow conductor when said auxiliary flow control device is secured to the main flow control device and (b) preventing flow from said flow passage of said mandrel through said first flow opening of said conductor when said auxiliary flow control device is not secured to said main flow control device, and having second inlet means permitting flow in one direction only into the flow passage of the mandrel through said second flow opening of said conductor and thence upwardly into the flow passage of the well flow conductor when said auxiliary flow control device is secured to the main flow control device; said auxiliary flow control device having means forming with the mandrel a pair of flow passages each communicating with a separate one of said inlet means; said auxiliary* flow control device having means providing a *separate* restricted orifice for each of said *pair of* flow passages for controlling the flow of fluids through said *pair of* flow passages.

17. A main flow control device for a well flow conductor having a longitudinal flow passage and having means providing a first flow opening and a second flow opening from the exterior of said conductor to the flow passage thereof at longitudinally spaced [positions] *locations*, said main flow control device including: a mandrel having a flow passage positionable in the well flow conductor, said mandrel having first inlet means providing communication between said flow passage of said mandrel and said first flow opening of said conductor and second inlet means providing communication between said flow passage of said mandrel and said second flow opening of said conductor for directing flow of fluids from said flow openings unidirectionally into the flow passage of the mandrel and thence upwardly into the flow passage of the well flow conductor; and an auxiliary flow control device securable to the upper end of the mandrel and having means forming with the mandrel a pair of flow passages each communicating with a separate one of said inlet means; said auxiliary flow control device having means providing a separate restricted orifice for each of said *pair of* flow passages for controlling *the* flow of fluids through said *pair of* flow passages; said pair of flow passages opening upwardly adjacent one another into the flow passage of the well flow conductor whereby *the* flow of well fluids from one of said flow openings assists the flow of well fluids upwardly from the other of said flow openings.

*18. A main flow control device, for a well flow conductor having a longitudinal flow passage and a first lateral port communicating with the flow passage intermediate the ends thereof, including: an elongate mandrel positioned in the well flow conductor and provided with an internal flow passage for communicating at its upper end with the flow passage in the well flow conductor and with a second lateral port intermediate the ends of the mandrel for communicating with the exterior of the mandrel and said internal flow passage and with said first lateral port; seal means carried by the mandrel for sealing between the well flow conductor and the mandrel below said lateral ports; said mandrel having an aperture communicating with the flow passage of the well flow conductor below the seal means; and an auxiliary flow control*

*device releasably securable to the upper end of the mandrel having means extending into said internal flow passage providing with said internal flow passage, when the auxiliary flow control device is secured to the main flow control device, a first flow passage communicating with said second lateral port and opening into the well flow conductor above said first lateral port and providing a second flow passage communicating with said aperture and opening into the well flow conductor above said first lateral port; means carried by the mandrel permitting flow in one direction only into the internal flow passage of the mandrel through said second lateral port when said auxiliary flow control device is secured to the main flow control device; means carried by the mandrel (a) permitting flow in one direction only into the internal flow passage of the mandrel through said aperture when said auxiliary flow control device is secured to the main flow control device and (b) preventing flow from said last-named flow passage through said aperture when said auxiliary flow control device is not secured to said main flow control device; and means in each of said first and second flow passages providing restricted orifices of predetermined relative sizes.*

References Cited

UNITED STATES PATENTS

| | | | |
|---|---|---|---|
| 2,180,605 | 11/1939 | Otis | 166—224 X |
| 2,246,811 | 6/1941 | Otis. | |
| 2,606,616 | 8/1952 | Otis | 166—219 X |
| 2,726,723 | 12/1955 | Wilhoit et al. | 166—224 |
| 2,726,724 | 12/1955 | Wilhoit et al. | 166—224 |
| 2,766,831 | 10/1956 | Otis. | |
| 2,839,144 | 6/1958 | Ault | 166—224 X |
| 2,859,825 | 11/1958 | Wilhoit | 166—133 |

CHARLES E. O'CONNELL, *Primary Examiner.*

IAN A. CALVERT, *Assistant Examiner.*